United States Patent Office 2,787,483
Patented Apr. 2, 1957

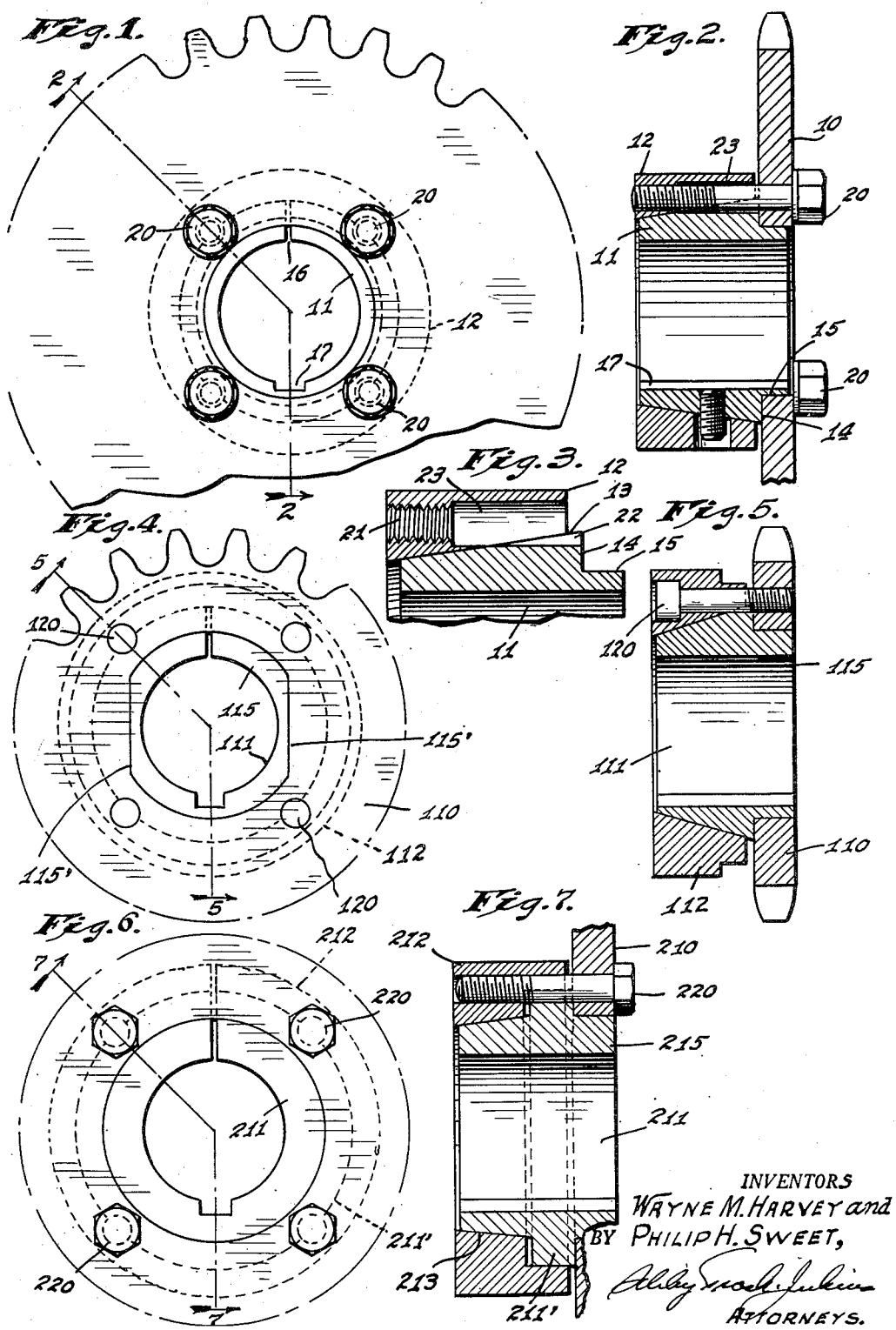

2,787,483

MOUNTING FOR SPROCKETS AND THE LIKE

Wayne M. Harvey and Philip H. Sweet, Indianapolis, Ind., assignors to Diamond Chain Company, Inc., Indianapolis, Ind., a corporation of Indiana Application April 16, 1953, Serial No. 349,154

6 Claims. (Cl. 287—52.06)

This invention relates to means for firmly mounting on a shaft a power-receiving element, such as a gear, sprocket, or pulley. Ordinary shafting is not finished to close tolerances; and a sprocket or the like having a bore large enough to receive the largest shaft of any nominal diameter may be so insecurely supported from a smaller shaft that it will wobble in service, thus creating wear conducive to greater looseness and further wobbling. Because of this, it has been proposed to provide for such an element a mounting means including a split bushing which can be collapsed to varying degrees as necessary to accommodate for variations in shaft diameter. In one commonly used arrangement, the gear, pulley, or sprocket has a tapered bore and receives a split, tapered bushing, which, when forced into the bore, is collapsed into firm engagement with the shaft.

A disadvantage of the mounting just described lies in the fact that the bushing occupies a fixed position on the shaft; and since the operation of collapsing the bushing involves relative axial movement of the bushing and the element which it is to support, such element necessarily moves axially as the bushing is collapsed. Because of this, it is frequently difficult to locate the sprocket, gear, or pulley in the desired axial position.

It is an object of this invention, therefore, to provide for a gear, sprocket, pulley, or like element a split-bushing mounting which can be tightened or collapsed onto a shaft without involving any axial movement of the element which is to be mounted. A further object of the invention is to produce a split-bushing mounting which can be simply and economically manufactured, which can readily be applied to gears, pulleys, or sprockets of different types, which will not require that the gear, sprocket, or pulley have a hub long enough to receive the collapsible bushing, and which will provide a sturdy mounting for the element it supports.

In carrying out the invention in its preferred form, we employ a tapered, split bushing having an outwardly presented shoulder near its larger end. Outwardly beyond such shoulder, the bushing is cylindrical to provide a pilot portion receivable within a central opening of the gear, sprocket, or pulley which is to be mounted. On the tapered portion of the bushing we provide a ring having a tapered bore. Bolts or screws acting between such ring and the mounted element force the ring axially along the bushing in a direction which will cause collapse of the bushing. Desirably, the bushing, as well as the ring and mounted element, has openings which receive the bolts or screws, whereby the bolts or screws will effectively key the ring and mounted element together for rotation as a unit.

The accompanying drawings illustrate the invention:

Fig. 1 is a fragmental elevation of a sprocket and a split-bushing mounting therefor;

Fig. 2 is an axial section on the line 2—2 of Fig. 1;

Fig. 3 is a fragmental view similar to Fig. 2 but on an enlarged scale;

Fig. 4 is a view similar to Fig. 1 illustrating a modified mounting;

Fig. 5 is an axial section on the line 5—5 of Fig. 4;

Fig. 6 is a view similar to Figs. 1 and 4 illustrating a further modification; and Fig. 7 is an axial section on the line 7—7 of Fig. 6.

The structure illustrated in Figs. 1, 2, and 3 comprises a plate-type sprocket 10, a bushing 11, and a ring 12. For the major portion of its length, the bushing 11 has a frusto-conical outer surface 13. At the larger-diameter end of the surface 13, the bushing is reduced in diameter to provide an outwardly presented shoulder 14 and a cylindrical pilot portion 15 received in a central opening in the sprocket 10. A slot or slit 16 (Fig. 1) extends through the wall of the bushing 11 to render it collapsible. The bushing may also be provided interiorly with a keyway 17 which is conveniently located diametrically opposite the slit 16.

The ring 12 has a bore complementary to the frusto-conical surface 13 of the bushing 11. The sprocket 10 and ring 12 are provided with annular series of openings for the reception of means whereby the ring may be drawn toward the sprocket 10 to collapse the bushing. As shown, such means comprises screws 20 which extend through the sprocket 10 into screw-threaded openings 21 in the ring 12. Conveniently, these openings are located in part within the periphery of the bushing 11, and the exterior of the bushing is provided with grooves 22 (Fig. 3) permitting passage of the screws. If this arrangement is employed, the holes 21 in the ring are desirably counterbored as shown at 23 to or beyond the point at which the threads of the hole lie wholly in the ring.

With the screws 20 loose, the unit illustrated in Fig. 2 is placed upon the shaft and moved therealong to the desired position, whereupon the screws 20 are tightened. In the tightening of the screws 20, the sprocket 10 is forced firmly against the shoulder 14 thus locating the sprocket in fixed position relative to the bushing. As the bushing collapses into engagement with the shaft it and the sprocket become located in fixed position relative to the shaft. Further tightening of the screws 20 moves the ring 12 axially toward the sprocket without disturbing the axial position of the latter.

In the structure illustrated in Figs. 4 and 5, the bushing 111 has a pilot portion 115 machined to provide two diametrically opposite flat sides 115', and the central hole in the sprocket is shaped to fit such pilot portion. The bushing 111 and sprocket 110 are thus secured together for joint rotation independently of the screws which act between the ring 112 and the sprocket to collapse the bushing. As shown in Fig. 5 the screws 120 pass through the ring into screw threaded openings in the sprocket 110, the outer ends of the openings in the ring 112 being counterbored to receive the screw heads.

In the structure shown in Figs. 6 and 7 the bushing 211 is provided exteriorly with an annular flange 211' which separates the frusto-conical bushing surface 213 from the pilot portion 215. Clamp screws 220 pass through the sprocket 210 and through the flange 211' into screw-threaded openings in the ring 212. If desired, the flange 211' may have a diameter less than the outer diameter of the ring 212, and such ring may be counterbored to receive it. The use of a flange 211' projecting radially outward beyond the tapered surface of the bushing 215 makes it possible to increase the bearing area between the bushing and the screws 220 and to reduce the stresses imposed on the screws as an incident to the transmission of driving torque between the sprocket 210 and the bushing through the screws. As shown, the diameter of the flange 211' is approximately equal to that of the circle on which the screws 220 are located, and the screw-passing openings in the flange are therefore mere notches. Increasing the diameter of the flange, even to a point such that the screws 220 lay wholly within its periphery and pass through complete holes, would further increase bearing area and reduce stresses in the screws.

It is to be understood that the sprocket 10 is shown herein only as an example of an element which can be mounted through employment of our invention and that all embodiments of the invention described are set forth merely as examples.

We claim as our invention:

1. In combination with a torque transmitting element to be mounted on a shaft, said element having a central opening larger than the shaft, a longitudinally split bushing having a central shaft-receiving bore, said bushing having at one end a pilot portion of reduced external diameter receivable in the opening of said element and providing a shoulder engaging said element to limit its movement axially of said bushing, said pilot portion serving to locate said element concentrically with respect to said bushing, said bushing beyond said shoulder having a tapered outer surface, a ring having a tapered bore fitting such surface, and means acting between said ring and element for drawing the ring toward the element to collapse said bushing and hold the element against said shoulder, said torque-transmitting element being of larger diameter than said ring and having a peripheral portion adapted for reception of a flexible torque-applying element and at least partially coextensive axially with said pilot portion.

2. The invention set forth in claim 1 with the addition that said means comprises screws located at least in part within that portion of said bushing having said tapered outer surface, such bushing-portion being provided with grooves receiving said screws.

3. The invention set forth in claim 1 with the addition that the opening in said element and the pilot portion of the bushing are of non-circular cross-section.

4. In combination with a torque transmitting element to be mounted on a shaft, a longitudinally split bushing having a central shaft-receiving bore and an exterior annular flange located between its ends, said element lying against said flange and having a central opening receiving and fitting a pilot portion constituted by one end of the bushing, the opposite end of the bushing having a tapered outer surface, a ring having a tapered bore fitting such surface, said ring, flange, and element having an annular series of aligned openings, and screws extending through said openings for drawing the ring toward the element to collapse the bushing and hold the element against said flange, said torque-transmitting element being of larger diameter than said ring and having a peripheral portion adapted for reception of a flexible torque-applying element and at least partially coextensive axially with said pilot portion.

5. In combination with a torque-transmitting element to be mounted on a shaft, said element having a central opening larger than the shaft, a longitudinally split bushing having a central shaft-receiving bore, said bushing having at one end a pilot portion of reduced external diameter extending in the opening of said element, an abutment engaging said element to limit its movement toward the other end of the bushing, said pilot portion serving to locate said element concentrically with respect to said bushing, such other end of the bushing having a tapered outer surface, a ring having a tapered bore fitting such surface, and means acting between said ring and element for drawing the ring toward the element to collapse said bushing, said torque-transmitting element being of larger diameter than said ring and having a peripheral portion adapted for reception of a flexible torque-applying element and at least partially coextensive axially with said pilot portion.

6. In combination with a torque-transmitting element to be mounted on a shaft, said element having a central opening larger than the shaft, a longitudinally split bushing having a central shaft-receiving bore, said bushing having at one end a pilot portion of reduced external diameter receivable in the opening of said element, an abutment engaging said element to limit its movement toward the other end of the bushing, said pilot portion serving to locate said element concentrically with respect to said bushing, such other end of the bushing having a tapered outer surface, a ring having a tapered bore fitting such surface, and means acting between said ring and element for drawing the ring toward the element to collapse said bushing, said torque-transmitting element being of larger diameter than said ring and having at its periphery an annular series of teeth adapted for engagement with a torque-applying element and at least partially coextensive axially with said pilot portion.

References Cited in the file of this patent

UNITED STATES PATENTS

| Re. 22,485 | Otto | May 23, 1944 |
| 738,445 | Hoffman | Sept. 8, 1903 |
| 1,674,889 | Craig | June 26, 1928 |
| 2,407,032 | Myers | Sept. 3, 1946 |
| 2,482,662 | Dunne | Sept. 20, 1949 |
| 2,519,958 | Firth | Aug. 22, 1950 |
| 2,564,335 | Lake | Aug. 14, 1951 |
| 2,669,471 | Breslow | Feb. 16, 1954 |